US009227666B2

(12) United States Patent
Yoshioka et al.

(10) Patent No.: US 9,227,666 B2
(45) Date of Patent: Jan. 5, 2016

(54) VEHICLE FRAME STRUCTURE

(71) Applicant: TOYOTA JIDOSHA KABUSHIKI KAISHA, Toyota-shi, Aichi-ken (JP)

(72) Inventors: Hideyuki Yoshioka, Okazaki (JP); Akiyoshi Watanabe, Toyota (JP); Norimasa Koreishi, Toyota (JP); Kentaro Adachi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/573,825

(22) Filed: Dec. 17, 2014

(65) Prior Publication Data

US 2015/0175218 A1 Jun. 25, 2015

(30) Foreign Application Priority Data

Dec. 25, 2013 (JP) .................................. 2013-268116

(51) Int. Cl.
*B62D 25/02* (2006.01)
*B62D 25/04* (2006.01)

(52) U.S. Cl.
CPC .............. *B62D 25/04* (2013.01); *B62D 25/025* (2013.01)

(58) Field of Classification Search
CPC ...... B62D 27/023; B62D 25/04; B62D 25/025
USPC ........... 296/193.06, 187.12, 209, 205, 203.03
See application file for complete search history.

(56) References Cited

U.S. PATENT DOCUMENTS

| 5,246,264 A | 9/1993 | Yoshii | |
|---|---|---|---|
| 7,520,563 B1 * | 4/2009 | An et al. | 296/204 |
| 8,911,004 B2 * | 12/2014 | Yao | 296/193.06 |
| 2004/0212222 A1 * | 10/2004 | Katsuma | 296/203.03 |
| 2008/0106119 A1 * | 5/2008 | Ma et al. | 296/187.12 |
| 2008/0231078 A1 * | 9/2008 | Tomozawa | 296/187.02 |
| 2010/0109385 A1 * | 5/2010 | Yamada et al. | 296/209 |
| 2010/0270830 A1 * | 10/2010 | Maruyama | 296/209 |
| 2012/0091762 A1 * | 4/2012 | Pohl et al. | 296/209 |
| 2013/0020833 A1 | 1/2013 | Yao | |
| 2013/0049408 A1 | 2/2013 | Kurogi et al. | |
| 2013/0193716 A1 * | 8/2013 | Kurokawa | 296/193.06 |
| 2015/0145283 A1 * | 5/2015 | Nishino et al. | B62D 25/2018 |

FOREIGN PATENT DOCUMENTS

| JP | H02-26977 U | 2/1990 |
|---|---|---|
| JP | H05-39063 A | 2/1993 |
| JP | 2002-053068 A | 2/2002 |
| JP | 2009-286268 A | 12/2009 |
| JP | A-2011-105269 | 6/2011 |
| JP | A-2011-219014 | 11/2011 |
| JP | A-2013-49378 | 3/2013 |

OTHER PUBLICATIONS

Partial translation of Oct. 27, 2015 Office Action issued in Japanese Application No. 2013-268116.

* cited by examiner

*Primary Examiner* — Jason S Morrow
(74) *Attorney, Agent, or Firm* — Oliff PLC (57) ABSTRACT

A vehicle frame structure includes a pair of hat-shaped panels that form a portion of a vehicle, each hat-shaped panel having a hat-shaped cross-section, the pair of hat-shaped panels facing each other and forming a closed sectional portion; a partition panel that is sandwiched by the pair of hat-shaped panels, and divides an inside of the closed sectional portion; and a laser welded portion where all of four or more plates including the pair of hat-shaped panels and the partition panel are overlapped and welded together at an identical position by laser welding.

4 Claims, 6 Drawing Sheets

VEHICLE FRAME STRUCTURE

INCORPORATION BY REFERENCE

The disclosure of Japanese Patent Application No. 2013-268116 filed on Dec. 25, 2013 including the specification, drawings and abstract is incorporated herein by reference in its entirety.

BACKGROUND OF THE INVENTION

1. Field of the Invention

The invention relates to a vehicle frame structure.

2. Description of Related Art

Japanese Patent Application Publication No. 2011-219014 (JP 2011-219014 A) describes technology related to a center pillar in which an outer reinforcement and a belt anchor reinforcement are arranged between a center pillar outer and a center pillar inner. Also, Japanese Patent Application Publication No. 2013-049378 (JP 2013-049378 A) describes technology related to a side sill (rocker) in which one portion in a vehicle longitudinal direction that is inside a closed sectional portion formed by a side sill inner and a side sill outer is divided by a plate-like bulkhead. Further, Japanese Patent Application Publication No. 2011-105269 (JP 2011-105269 A) describes technology related to a pillar lower portion structure in which a closed sectional portion is formed between a rocker inner panel and an outer panel in which a pillar outer panel and a member corresponding to a rocker outer panel are integrally formed, and the pillar inner panel is arranged inside the closed sectional portion.

Also, in the related art described above, a plurality of panels are integrated by being joined by spot welding.

However, normally, when spot welding is used with plates for a vehicle, no more than three plates can be overlapped and joined at an identical position in view of weld quality. Therefore, when joining four plates, a cutout, a hole or the like must be formed in one of the plates so that there are three plates at the welding point of the spot welding. However, if a cutout or a hole is formed in the plate in this way, the rigidity of the plate will end up decreasing.

SUMMARY OF THE INVENTION

The invention provides a vehicle frame structure that enables four or more plates to be joined together without a reduction in rigidity.

One aspect of the invention relates to a vehicle frame structure. The vehicle frame structure includes i) a pair of hat-shaped panels that form a portion of a vehicle, each hat-shaped panel having a hat-shaped cross-section, the pair of hat-shaped panels facing each other and forming a closed sectional portion; ii) a partition panel that is sandwiched by the pair of hat-shaped panels, and divides an inside of the closed sectional portion; and iii) a laser welded portion where all of four or more plates including the pair of hat-shaped panels and the partition panel are overlapped and welded together at an identical position by laser welding.

In the aspect described above, the pair of hat-shaped panels that form a portion of the vehicle and each have a hat-shaped cross-section are provided. These hat-shaped panels face each other to form a closed sectional portion, and the inside of the closed sectional portion is divided by a partition panel that is sandwiched by the pair of hat-shaped panels. Here, in this aspect, a laser welded portion is provided where all of the four or more panels including the pair of hat-shaped panels and the partition panel are overlapped and welded together at an identical position by laser welding.

With laser welding, so-called LSW (Laser Screw Welding), four or more plates can be welded together, so there is no need to form a cutout or a hole in a laser welded portion with four or more plates. Therefore, all of the plates are able to be welded (joined) together at an identical position while rigidity is ensured.

As described above, the foregoing aspect of the invention has the beneficial effect of being able to join four or more plates without a reduction in rigidity.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A vehicle frame structure according to an example embodiment of the invention will now be described with reference to the accompanying drawings. In the drawings, a vehicle longitudinal direction front side is indicated by arrow FR, a vehicle width direction is indicated by arrow W, and a vehicle vertical direction upper side is indicated by arrow UP. Also, unless otherwise specified, directions of front and rear in the description below indicate front and rear in the vehicle longitudinal direction, and directions of upper and lower in the description below indicate upper and lower in the vehicle up-and-down direction.

(Structure of Vehicle Frame Structure)

Figure 1:
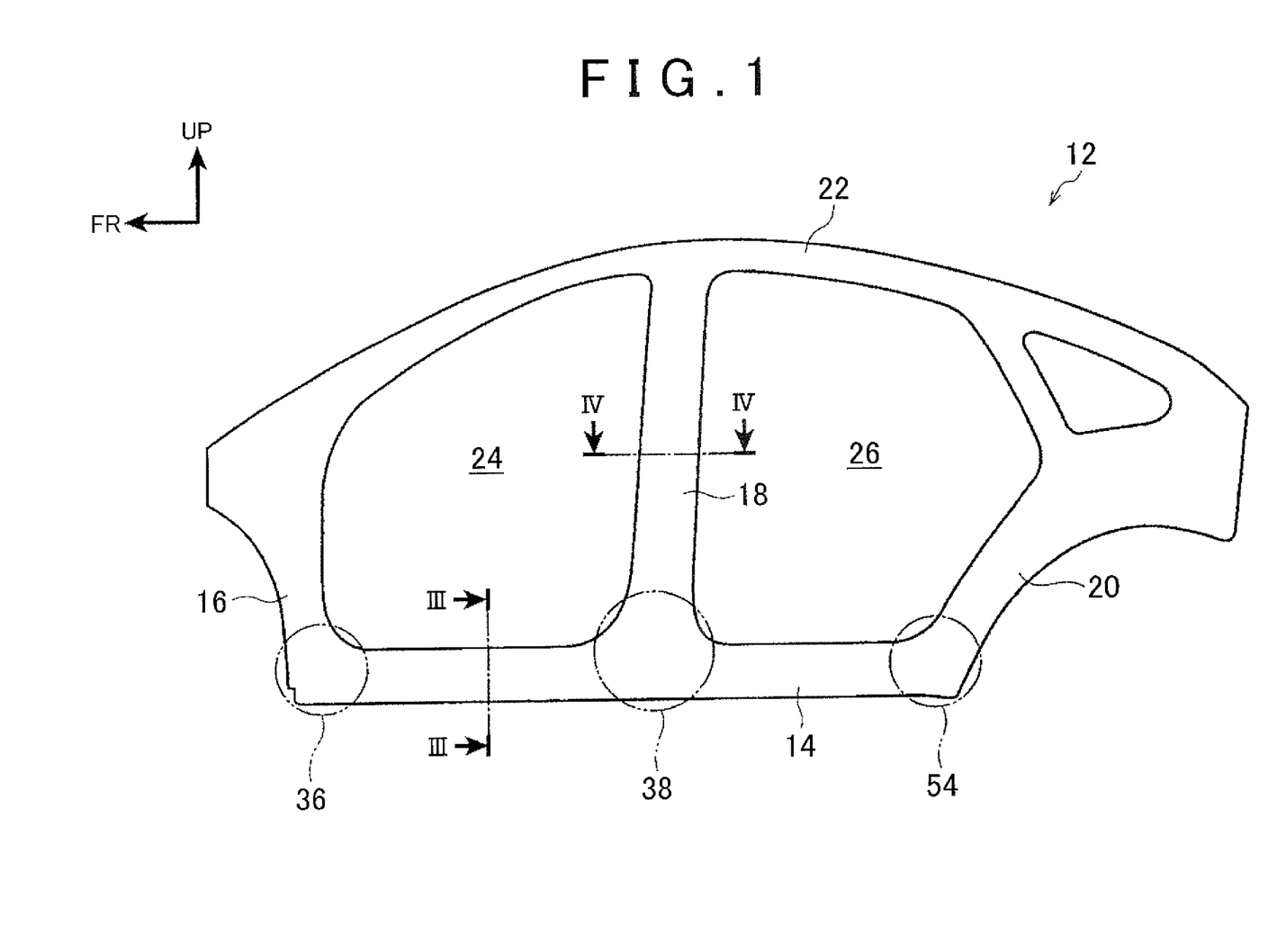
FIG. 1 is a perspective view of a vehicle to which a vehicle frame structure according to one example embodiment of the invention has been applied.

As shown in FIG. 1, a rocker 14 extends in the vehicle longitudinal direction at a lower portion of a vehicle side portion, on a vehicle 12 to which a vehicle frame structure 10 (see FIG. 2) according to this example embodiment has been applied. A front pillar 16 extends upward from a front end portion of this rocker 14. Also, a center pillar 18 extends upward from a vehicle longitudinal direction center portion of the rocker 14. A rear pillar 20 extends upward from a rear end of the rocker 14. A roof side rail 22 that extends in the vehicle longitudinal direction is joined to each of an upper end portion of the front pillar 16, an upper end portion of the center pillar 18, and an upper end portion of the rear pillar 20.

A front side door opening 24 that is generally rectangular when viewed from a side of the vehicle is formed by the rocker 14, the front pillar 16, the roof side rail 22, and the center pillar 18. Also, a rear side door opening 26 that is generally rectangular when viewed from a side of the vehicle is formed by the rocker 14, the center pillar 18, the roof side rail 22, and the rear pillar 20. The cabin is open/closably separated from the outside of the vehicle by the front side door opening 24 and the rear side door opening 26 being closed by a front side door and a rear side door, respectively.

Figure 3:
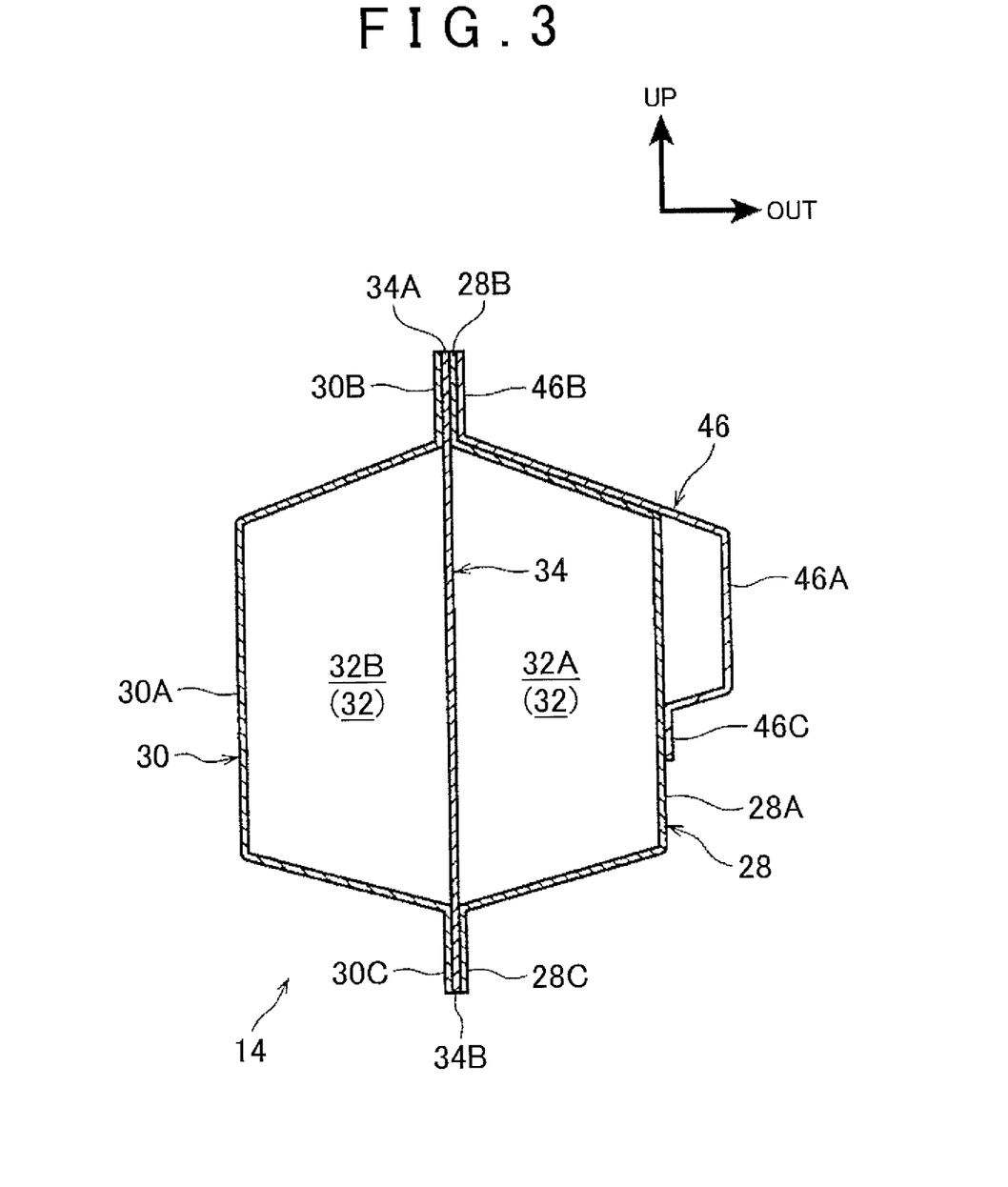
FIG. 3 is a sectional view of the rocker cut along line III-III in FIG. 1.

Here, FIG. 3 is a sectional view of the rocker 14 shown in FIG. 1, shown cut along line III-III. As shown in FIG. 3, the rocker 14 includes a rocker outer panel 28 as one of a pair of hat-shaped panels that is arranged on the vehicle width direction outside, and a rocker inner panel 30 as the other of the pair of hat-shaped panels that is arranged on the vehicle width direction inside.

The rocker outer panel 28 is made of steel sheet, with a sectional shape cut along the vehicle width direction being hat-shaped and open toward the vehicle width direction inside. On this rocker outer panel 28, an upper flange portion 28B extends upward from an upper end portion of a base wall portion 28A that is a so-called general portion. Also, a lower flange portion 28C extends downward from a lower end portion of the base wall portion 28A.

Also, the rocker inner panel 30 is made of steel sheet, with a sectional shape cut along the vehicle width direction being hat-shaped and open toward the vehicle width direction outside. On this rocker inner panel 30, an upper flange portion 30B extends upward from an upper end portion of a base wall portion 30A that is a so-called general portion. Also, a lower flange portion 30C extends downward from a lower end portion of the base wall portion 30A.

The upper flange portion 28B of the rocker outer panel 28 and the upper flange portion 30B of the rocker inner panel 30 are able to be joined together. Also, the lower flange portion 28C of the rocker outer panel 28 and the lower flange portion 30C of the rocker inner panel 30 are able to be joined together. The joining of the panels will be described later.

A hexagonal closed sectional portion 32 is then formed between the rocker outer panel 28 and the rocker inner panel 30, by the rocker outer panel 28 and the rocker inner panel 30 being joined together. A partition panel 34 as a rocker partition panel is arranged along the vehicle longitudinal direction, between the rocker outer panel 28 and the rocker inner panel 30, so as to divide the closed sectional portion 32 in the vehicle width direction (into trapezoidal-shaped closed sectional portions 32A and 32B).

This partition panel 34 is provided in the rocker 14 from a joining area 36 where the front pillar 16 shown in FIG. 1 is joined, all the way to a joining area 38 where the center pillar 18 is joined. Also, an end portion 34A is provided facing the upper flange portion 28B of the rocker outer panel 28, on the partition panel 34, as shown in FIG. 3. The end portion 34A is arranged between the upper flange portion 28B of the rocker outer panel 28, and the upper flange portion 30B of the rocker inner panel 30. Also, an end portion 34B is provided facing the lower flange portion 28C of the rocker outer panel 28, on the partition panel 34. This end portion 34B is arranged between the lower flange portion 28C of the rocker outer panel 28 and the lower flange portion 30C of the rocker inner panel 30.

Figure 4:
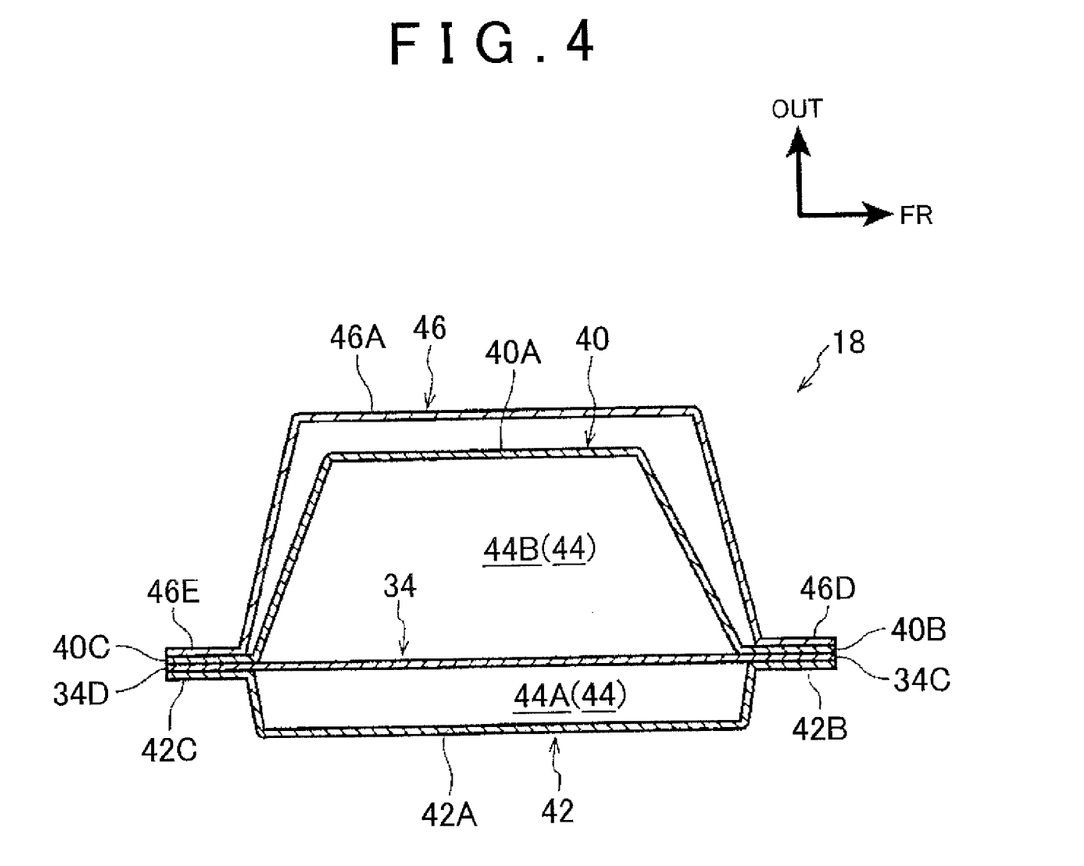
FIG. 4 is a sectional view of the center pillar cut along line IV-IV in FIG. 1.

Meanwhile, FIG. 4 is a sectional view of the center pillar 18 shown in FIG. 1, shown cut along line IV-IV. As shown in FIG. 4, the center pillar 18 includes a pillar outer reinforcement 40 as a hat-shaped panel that is arranged on the vehicle width direction outside, and a pillar inner reinforcement 42 as a hat-shaped panel that is arranged on the vehicle width direction inside.

The pillar outer reinforcement 40 is made of steel sheet, with a sectional shape cut along the vehicle width direction being hat-shaped and open toward the vehicle width direction inside. On this pillar outer reinforcement 40, a front flange portion 40B extends forward from a front end portion of a base wall portion 40A that is a so-called general portion. Also, a rear flange portion 40C extends rearward from a rear end portion of the base wall portion 40A.

Also, the pillar inner reinforcement 42 is made of steel sheet, with a sectional shape cut along the vehicle width direction being hat-shaped and open toward the vehicle width direction outside. On this pillar inner reinforcement 42, a front flange portion 42B extends forward from a front end portion of a base wall portion 42A that is a so-called general portion. Also, a rear flange portion 42C extends rearward from a rear end portion of the base wall portion 42A.

The front flange portion 40B of the pillar outer reinforcement 40 and the front flange portion 42B of the pillar inner reinforcement 42 are able to be joined together. Also, the rear flange portion 40C of the pillar outer reinforcement 40 and the rear flange portion 42C of the pillar inner reinforcement 42 are able to be joined together. The joining of the panels will be described later.

A hexagonal closed sectional portion 44 is then formed between the pillar outer reinforcement 40 and the pillar inner reinforcement 42, by the pillar outer reinforcement 40 and the pillar inner reinforcement 42 being joined together. A partition panel 34 as a pillar partition panel is arranged in the vehicle up-and-down direction, between the pillar outer reinforcement 40 and the pillar inner reinforcement 42, so as to divide the closed sectional portion 44 in the vehicle width direction (into trapezoidal-shaped closed sectional portions 44A and 44B).

That is, this partition panel 34 has a shape in which an L-shape has been reversed back and forth when viewed from the side of the vehicle, and divides the inside of the closed sectional portion 32 of the rocker 14, as well as the inside of the closed sectional portion 44 of the center pillar 18.

A front end portion 34C is provided facing the front flange portion 40B of the pillar outer reinforcement 40, on the partition panel 34. This front end portion 34C is arranged between the front flange portion 40B of the pillar outer reinforcement 40 and the front flange portion 42B of the pillar inner reinforcement 42. Also, a rear end portion 34D is provided facing the rear flange portion 40C of the pillar outer reinforcement 40, on the partition panel 34. This rear end portion 34D is arranged between the rear flange portion 40C of the pillar outer reinforcement 40 and the rear flange portion 42C of the pillar inner reinforcement 42.

Also, as shown in FIGS. 3 and 4, a side member outer panel 46 that forms a design surface is provided on the vehicle width direction outside of the pillar outer reinforcement 40 (see FIG. 4) and the rocker outer panel 28 (see FIG. 3).

As shown in FIG. 3, the side member outer panel 46 includes both a weld portion 46B that faces the upper flange portion 28B of the rocker outer panel 28 and is welded (joined) to the upper flange portion 28B, and a weld portion 46C that faces the base wall portion 28A of the rocker outer panel 28 and is welded to the base wall portion 28A.

Further, as shown in FIG. 4, both a weld portion 46D that faces the front flange portion 40B of the pillar outer reinforcement 40 and is welded to the front flange portion 40B, and a weld portion 46E that faces the rear flange portion 40C of the pillar outer reinforcement 40 and is welded to the rear flange portion 40C, extend from a general portion 46A of the side member outer panel 46.

Figure 2:
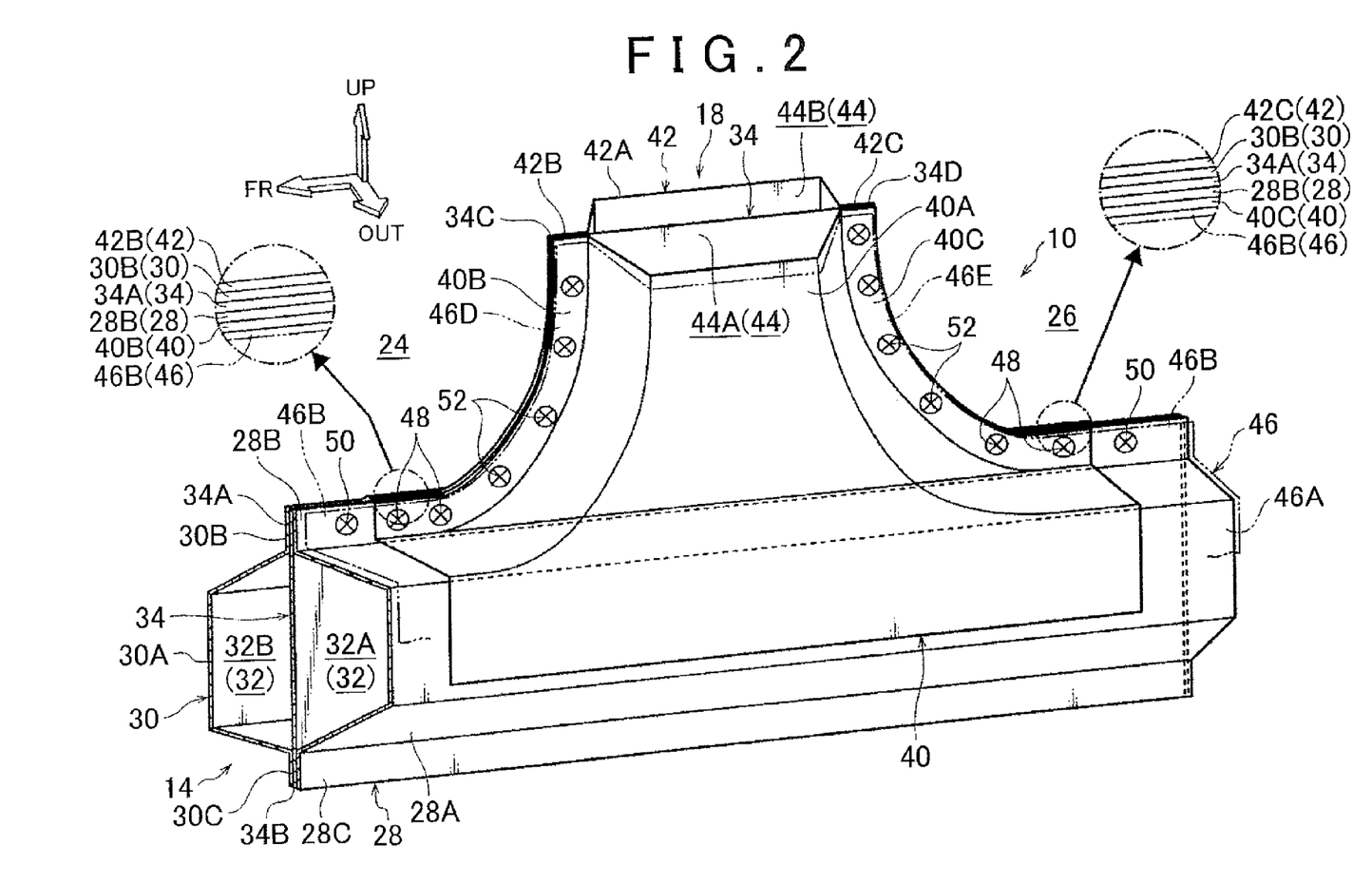
FIG. 2 is a perspective sectional view of a rocker and a center pillar to which the vehicle frame structure according to the example embodiment of the invention has been applied.

Here, in this example embodiment, six panels (plates), i.e., the weld portion 46B of the side member outer panel 46, the front flange portion 40B of the pillar outer reinforcement 40, the upper flange portion 28B of the rocker outer panel 28, the end portion 34A of the partition panel 34 (in some cases it may be the front end portion 34C of the partition panel 34 depending on its relationship to the center pillar 18), the upper flange portion 30B of the rocker inner panel 30, and the front flange portion 42B of the pillar inner reinforcement 42, are all joined by laser welding at identical positions (laser welded portions 48) on end portions thereof, at a rear portion and a lower portion of an inside edge portion on the front side door opening 24 side, as shown in FIG. 2.

Also, four panels (plates), i.e., the weld portion 46B of the side member outer panel 46, the upper flange portion 28B of the rocker outer panel 28, the end portion 34A of the partition panel 34, and the upper flange portion 30B of the rocker inner panel 30, are all joined by laser welding at an identical position (a laser welded portion 50) on end portions thereof, at a rear portion and a lower portion of an inside edge portion on the front side door opening 24 side.

Moreover, four panels (plates), i.e., the weld portion 46D of the side member outer panel 46, the front flange portion 40B of the pillar outer reinforcement 40, the front end portion 34C of the partition panel 34, and the front flange portion 42B of the pillar inner reinforcement 42, are all joined by laser welding at identical positions (laser welded portions 52) on end portions thereof, at a rear portion and a lower portion of an inside edge portion on the front side door opening 24 side.

Meanwhile, six panels (plates), i.e., the weld portion 46B of the side member outer panel 46, the rear flange portion 40C of the pillar outer reinforcement 40, the upper flange portion 28B of the rocker outer panel 28, the end portion 34A of the partition panel 34 (in some cases it may be the rear end portion 34D of the partition panel 34 depending on its relationship to the center pillar 18), the upper flange portion 30B of the rocker inner panel 30, and the rear flange portion 42C of the pillar inner reinforcement 42, are all joined by laser welding at identical positions (laser welded portions 48) on end portions thereof, at a front portion and a lower portion of an inside edge portion on the rear side door opening 26 side.

Also, four panels (plates), i.e., the weld portion 46B of the side member outer panel 46, the upper flange portion 28B of the rocker outer panel 28, the end portion 34A of the partition panel 34, and the upper flange portion 30B of the rocker inner panel 30, are all joined by laser welding at an identical position (a laser welded portion 50) on end portions thereof, at a front portion and a lower portion of an inside edge portion on the rear side door opening 26 side, similar to the front side door opening 24 side.

Moreover, four panels (plates), i.e., the weld portion 46E of the side member outer panel 46, the rear flange portion 40C of the pillar outer reinforcement 40, the rear end portion 34D of the partition panel 34, and the rear flange portion 42C of the pillar inner reinforcement 42, are all joined by laser welding at identical positions (laser welded portions 52) on end portions thereof, at a front portion and a lower portion of an inside edge portion on the rear side door opening 26 side.

The laser welding described above is LSW (laser screw welding), for example.

(Operation and Effects of the Vehicle Frame Structure)

Next, the operation and effects of the vehicle frame structure described above will be described.

In this example embodiment, the six panels (plates), i.e., the weld portion 46B of the side member outer panel 46, the front flange portion 40B of the pillar outer reinforcement 40, the upper flange portion 28B of the rocker outer panel 28, the end portion 34A of the partition panel 34, the upper flange portion 30B of the rocker inner panel 30, and the front flange portion 42B of the pillar inner reinforcement 42, are all joined by laser welding (LSW) at identical positions (laser welded portions 48) on end portions thereof, at the rear portion and the lower portion of an inside edge portion on the front side door opening 24 side, as shown in FIG. 2, for example.

With LSW, four or more plates are able to be welded, so there is no need to form a cutout or a hole at the laser welded portions 48, in the side member outer panel 46, the pillar outer reinforcement 40, the rocker outer panel 28, the partition panel 34, the rocker inner panel 30, and the pillar inner reinforcement 42. Therefore, all of these plates are able to be joined together at an identical position while the rigidity of the plates is ensured. Also, with LSW, because four or more plates are able to be welded together, productivity improves.

Furthermore, with the welding technology of LSW, the intervals of the welding points are able to be shorter than they are with spot welding technology. Therefore, the welding points are able to be concentrated at the portions where it is desirable to join the panels together. As a result, with the vehicle frame structure, rigidity is able to be improved, so steering stability of the vehicle 12 (see FIG. 1) is able to be improved. Although the number of plates is different, the laser welded portions 50 and 52 are substantially the same as the laser welded portions 48.

In this example embodiment, the partition panel 34 is arranged in the rocker 14 so as to divide the closed sectional portion 32 formed between the rocker outer panel 28 and the rocker inner panel 30. This partition panel 34 is provided from the joining area 36 where the front pillar 16 shown in FIG. 1 is joined, all the way to the joining area 38 where the center pillar 18 is joined. Also, as shown in FIG. 2, the partition panel 34 is joined to the rocker outer panel 28 and the rocker inner panel 30 at identical positions (laser welded portions 48 and 50) by laser welding between the rocker outer panel 28 and the rocker inner panel 30, as described above.

Figure 5A:
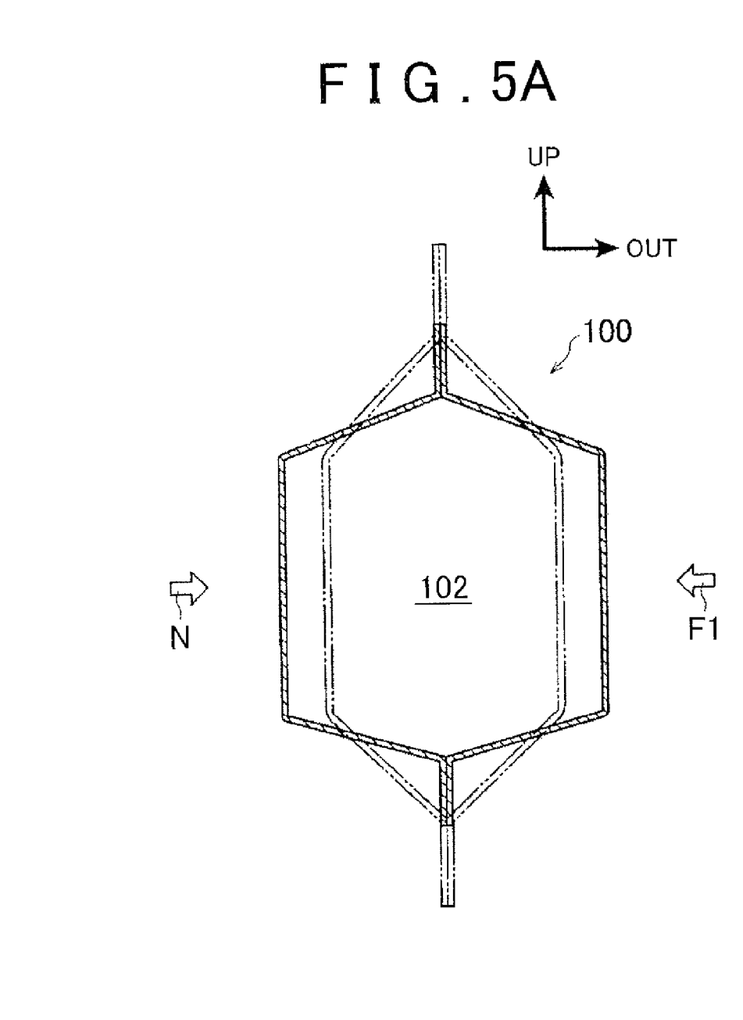
FIG. 5A is a sectional view illustrating operation of a rocker to which a vehicle frame structure according to a comparative example has been applied.

For example, as shown in FIG. 5A, when an impact load F1 is input to a rocker 100 when the vehicle is involved in a side collision, a closed sectional portion 102 inside the rocker 100 is compressed in the vehicle width direction by a reaction force N from a cross member or a floor panel, not shown, and so-called sectional collapse may occur, as indicated by the alternate long and two short dashes line.

On the other hand, with this example embodiment, high rigidity is able to be obtained in the rocker 14 by providing, in the rocker 14 that forms the closed sectional portion 32, the partition panel 34 that divides the closed sectional portion 32 in the extending direction of the rocker 14, as shown in FIG. 2.

Figure 5B:
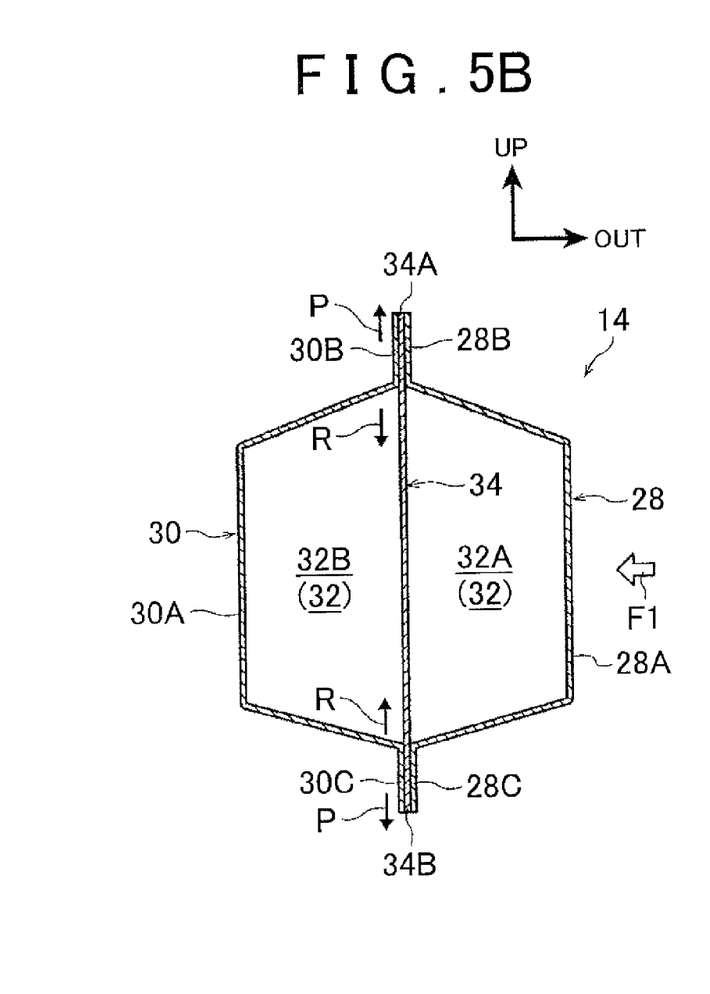
FIG. 5B is a sectional view illustrating operation of the rocker to which the vehicle frame structure according to the example embodiment of the invention has been applied.

As a result, even if an impact load F is input to the rocker 14 when the vehicle is involved in a side collision, resistance R against tension P that acts on the partition panel 34 is generated in the partition panel 34, as shown in FIG. 5B, so sectional collapse of the rocker 14 is able to be prevented or suppressed. Frame rigidity of the overall vehicle is able to be improved by preventing or suppressing sectional collapse of the rocker 14 in this way. As a result, the steering stability of the vehicle 12 (see FIG. 1) is able to be improved.

Figure 6A:
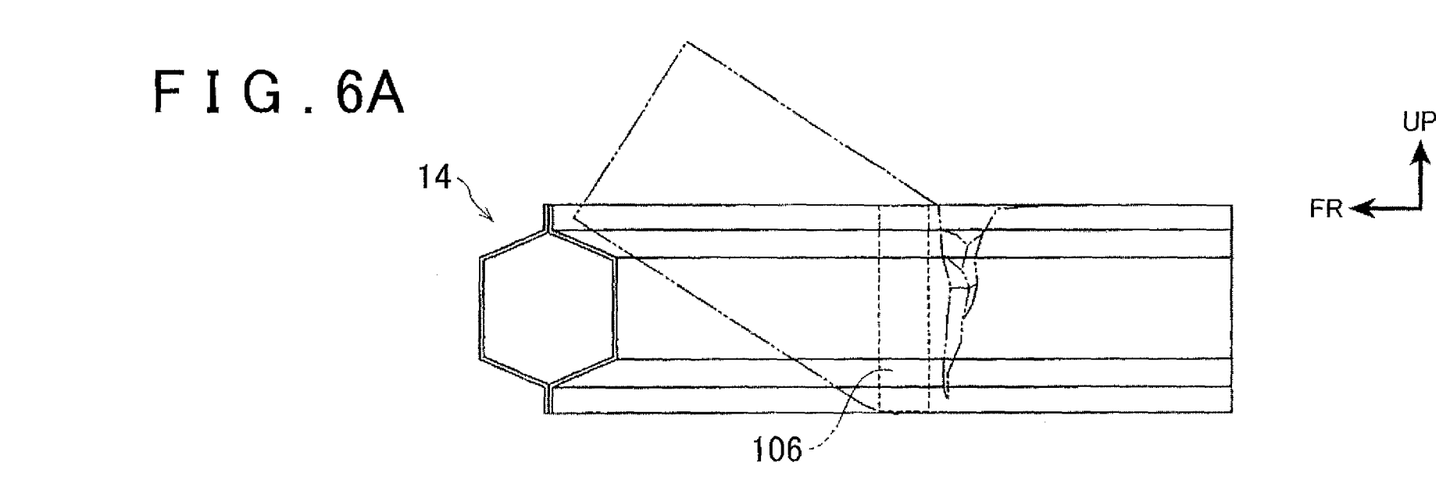
FIG. 6A is another sectional view illustrating operation of the rocker to which the vehicle frame structure according to the comparative example has been applied.

Also, a plate-like bulkhead 106 that divides the inside of a rocker 104 in the vehicle longitudinal direction may be arranged inside the rocker 104, as shown in FIG. 6A, for example. With this structure, the rocker 104 may bend in front and in back of the bulkhead 106 when upward bending stress is applied to the rocker 104 in a frontal collision of a manner in which an impact load is input to a vehicle width direction outside at a vehicle front portion (a so-called small overlap collision).

Figure 6B:
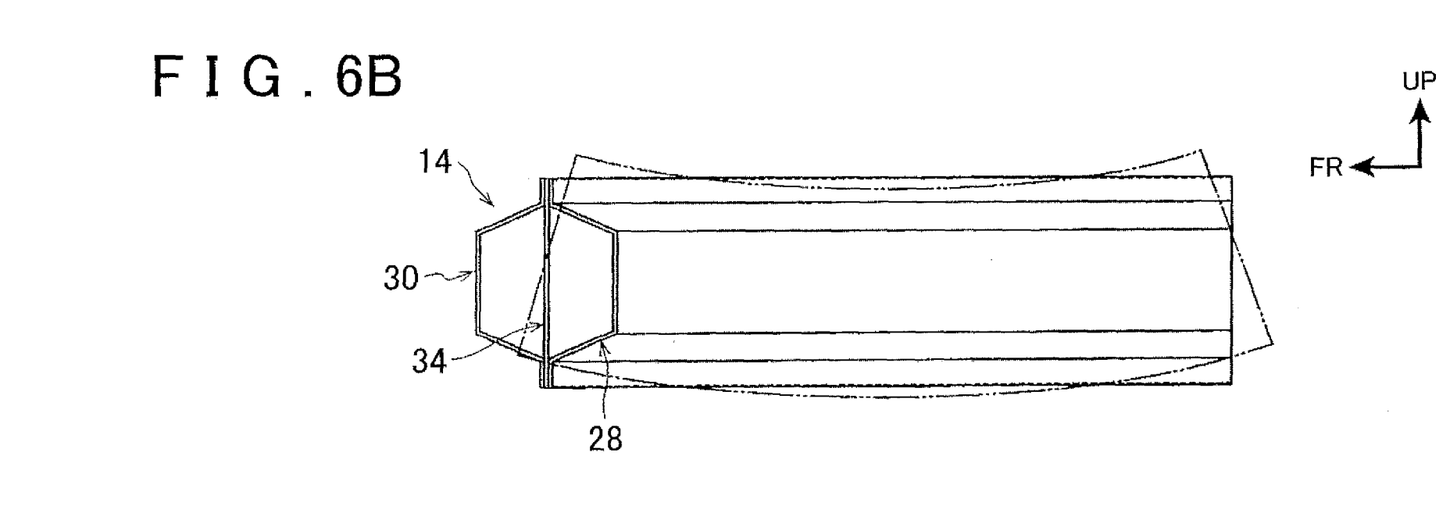
FIG. 6B is another sectional view illustrating operation of the rocker to which the vehicle frame structure according to the example embodiment of the invention has been applied.

On the other hand, in this example embodiment, the partition panel 34 is provided in the rocker 14 from the joining area 36 where the front pillar 16 shown in FIG. 1 is joined, all the way to the joining area 38 where the center pillar 18 is joined, as shown in FIG. 6B. As a result, high rigidity of the rocker 14 is able to be obtained, so when the vehicle 12 is involved in a small overlap collision, the impact load is able to be reliably transmitted toward the vehicle longitudinal direction rear side via the rocker 14.

Also, in this example embodiment, the partition panel 34 is arranged in the center pillar 18 so as to divide the closed sectional portion 44 formed between the pillar outer reinforcement 40 and the pillar inner reinforcement 42, as shown in FIG. 2. Also, the partition panel 34 are joined together (the laser welded portions 48 and 52) by laser welding between the pillar outer reinforcement 40 and the pillar inner reinforcement 42, as described above.

In this way, high rigidity at the center pillar 18 is able to be obtained by providing the partition panel 34 that divides the closed sectional portion 44 in the extending direction of the center pillar 18, in the center pillar 18 that forms the closed sectional portion 44. As a result, when an impact load is input to the center pillar 18 when the vehicle 12 (see FIG. 1) is involved in a side collision, the impact energy is able to be absorbed.

Moreover, in this example embodiment, the partition panel 34 as a rocker partition panel that divides the closed sectional portion 32 of the rocker 14 is integrally formed with the partition panel 34 as a pillar partition panel that divides the closed sectional portion 44 of the center pillar 18. As a result, the rigidity of the rocker 14 and the center pillar 18 is able to be improved, and the impact energy is able to be even further absorbed when an impact load is input to the rocker 14 and the center pillar 18 when the vehicle 12 is involved in a side collision.

(Supplement Description of the Example Embodiment)

In this example embodiment, the partition panel 34 as a rocker partition panel in the rocker 14 shown in FIG. 2 is integrally formed with the partition panel 34 as a pillar partition panel in the center pillar 18, as described above. However, the structure is not limited to this as long as there is a partition panel that divides the inside of the closed sectional portion formed between the panels.

For example, although not shown, the rocker partition panel and the pillar partition panel may be provided separately. Also, a partition panel may also be provided in either one of the rocker 14 and the center pillar 18. Moreover, the partition panel is not limited to being provided inside the center pillar 18, but may also be provided inside the front pillar 16 or inside the rear pillar 20 shown in FIG. 1. Furthermore, a partition panel may also be provided inside the roof side rail 22.

Also, in this example embodiment, the partition panel 34 is provided in the rocker 14 from the joining area 36 where the front pillar 16 shown in FIG. 1 is joined, all the way to the joining area 38 where the center pillar 18 is joined, but it may also be provided only at the joining area 38 where the center pillar 18 is joined. Furthermore, the partition panel 34 may also be provided from the joining area 36 where the front pillar 16 is joined, all the way to a joining area 54 where the rear pillar 20 is joined.

While an example embodiment of the invention has been described, the invention is not in any way limited to this example embodiment. To the contrary, the invention may be carried out in any one of a variety of other modes within the scope of the invention.

What is claimed is:

1. A vehicle frame structure comprising:
a pair of hat-shaped panels that form a portion of a vehicle, each hat-shaped panel having a hat-shaped cross-section, the pair of hat-shaped panels facing each other and forming a closed sectional portion;
a partition panel that is sandwiched by the pair of hat-shaped panels, and divides an inside of the closed sectional portion; and
a laser welded portion where all of four or more plates including the pair of hat-shaped panels and the partition panel are overlapped and welded together at an identical position by laser welding, wherein
the pair of hat-shaped panels and the partition panel form a rocker that extends in a vehicle longitudinal direction at an end portion of a vehicle lower portion in a vehicle width direction;
the rocker includes:
  i) a rocker outer panel that is arranged on a vehicle width direction outside, has a hat-shaped cross-section cut in the vehicle width direction, and corresponds to one of the pair of hat-shaped panels,
  ii) a rocker inner panel that is arranged to a vehicle width direction inside of the rocker outer panel, that has a hat-shaped cross-section cut in the vehicle width direction, that corresponds to the other of the pair of hat-shaped panels, and in which a closed sectional portion is formed between the rocker inner panel and the rocker outer panel, and
  iii) a rocker partition panel that divides the inside of the closed sectional portion, is arranged in an extending direction of the rocker, and corresponds to the partition panel,
the pair of hat-shaped panels forms a front pillar that is connected to a vehicle longitudinal direction front portion of the rocker and extends in a vehicle up-and-down direction, and a center pillar that is arranged to a vehicle longitudinal direction rear of the front pillar on the rocker, and extends in the vehicle up-and-down direction; and
the rocker partition panel is arranged from a joining portion where the front pillar is joined all the way to a joining portion where the center pillar is joined.

2. A vehicle frame structure comprising:
a pair of hat-shaped panels that form a portion of a vehicle, each hat-shaped panel having a hat-shaped cross-section, the pair of hat-shaped panels facing each other and forming a closed sectional portion;
a partition panel that is sandwiched by the pair of hat-shaped panels, and divides an inside of the closed sectional portion; and
a laser welded portion where all of four or more plates including the pair of hat-shaped panels and the partition panel are overlapped and welded together at an identical position by laser welding, wherein the pair of hat-shaped panels and the partition panel form a rocker that extends in a vehicle longitudinal direction at a front portion of a vehicle lower portion in a vehicle width direction, a front pillar that is connected to a vehicle longitudinal direction front portion of the rocker and extends in a vehicle up-and-down direction, and a center pillar that is arranged to a vehicle longitudinal direction rear of the front pillar and extends in the vehicle up-and-down direction; and at least the front pillar or the center pillar includes:
- i) a pillar outer reinforcement that is arranged on a vehicle width direction outside, has a hat-shaped cross-section cut in a vehicle width direction, and corresponds to one of the pair of hat-shaped panels,
- ii) a pillar inner reinforcement that is arranged to a vehicle width direction inside of the pillar outer reinforcement, that has a hat-shaped cross-section cut in the vehicle width direction, that corresponds to the other of the pair of hat-shaped panels, and in which a closed sectional portion is formed between the pillar inner reinforcement and the pillar outer reinforcement, and
- iii) a pillar partition panel that divides an inside of the closed sectional portion, is arranged in an extending direction of the front pillar or the center pillar, and corresponds to the partition panel.

3. The vehicle frame structure according to claim 2, wherein the pair of hat-shaped panels and the partition panel form a rocker that extends in the vehicle longitudinal direction at an end portion of a vehicle lower portion in the vehicle width direction;

the rocker includes:
- i) a rocker outer panel that is arranged on a vehicle width direction outside, has a hat-shaped cross-section cut in the vehicle width direction, and corresponds to one of the pair of hat-shaped panels,
- ii) a rocker inner panel that is arranged to a vehicle width direction inside of the rocker outer panel, that has a hat-shaped cross-section cut in the vehicle width direction, that corresponds to the other of the pair of hat-shaped panels, and in which a closed sectional portion is formed between the rocker inner panel and the rocker outer panel, and
- iii) a rocker partition panel that divides an inside of the closed sectional portion, extends in an extending direction of the rocker, and corresponding to the partition panel; and the rocker partition panel and the pillar partition panel are integrally formed.

4. The vehicle frame structure according to claim 3, wherein the laser welded portion is such that all of the plates of a side outer panel arranged to a vehicle width direction outside of the rocker and the pillar, the pillar outer reinforcement, the rocker outer panel, the partition panel, the rocker inner panel, and the pillar inner reinforcement are welded together by laser welding at the identical position.

* * * * *